(12) United States Patent
Ohta

(10) Patent No.: US 7,683,911 B2
(45) Date of Patent: Mar. 23, 2010

(54) IMAGE PROCESSING PROGRAM AND IMAGE PROCESSING APPARATUS

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1251 days.

(21) Appl. No.: 10/895,081

(22) Filed: Jul. 21, 2004

(65) Prior Publication Data

US 2005/0032574 A1 Feb. 10, 2005

(30) Foreign Application Priority Data

Jul. 23, 2003 (JP) ............... 2003-278645

(51) Int. Cl.
G06T 15/50 (2006.01)
(52) U.S. Cl. ................... 345/589
(58) Field of Classification Search ........... 345/690, 345/589
See application file for complete search history.

(56) References Cited

U.S. PATENT DOCUMENTS

| 5,805,295 A | 9/1998 | Mikami |
| 6,192,163 B1 | 2/2001 | Murayama |
| 6,618,056 B1 * | 9/2003 | Spekowius et al. .......... 345/690 |
| 7,348,991 B1 * | 3/2008 | Keating et al. .............. 345/589 |
| 2001/0017629 A1 | 8/2001 | Minagawa et al. |

FOREIGN PATENT DOCUMENTS

| JP | H07-141510 | 6/1995 |
| JP | 2000-322601 | 11/2000 |
| JP | 2001-070634 | 3/2001 |
| JP | 2001-084405 | 3/2001 |

* cited by examiner

Primary Examiner—Jeffery A Brier
(74) Attorney, Agent, or Firm—Nixon & Vanderhye P.C.

(57) ABSTRACT

When rendering individual 3D models arranged in a virtual game space, normal rendering is performed without performing toon shading. Then, after rendering of all the 3D models has been completed, toon processing is performed on the rendered image data stored in a color buffer, so as to obtain a well-defined transition between light and dark. By this, the process of displaying a 3D model in an animated format arranged in the virtual game space is simplified and the processing load is reduced.

11 Claims, 14 Drawing Sheets

F I G. 5
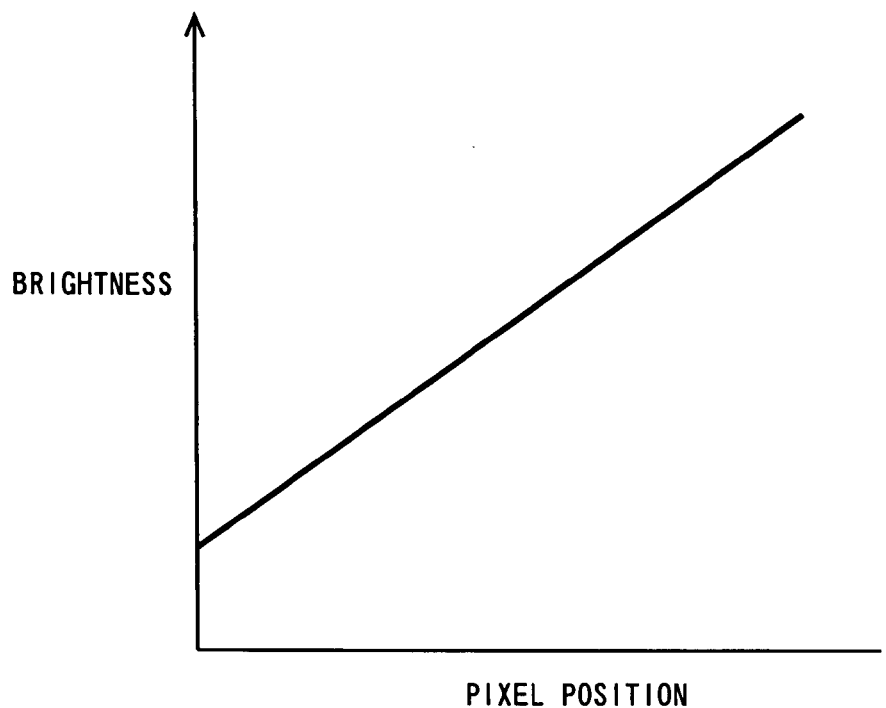
F I G. 6
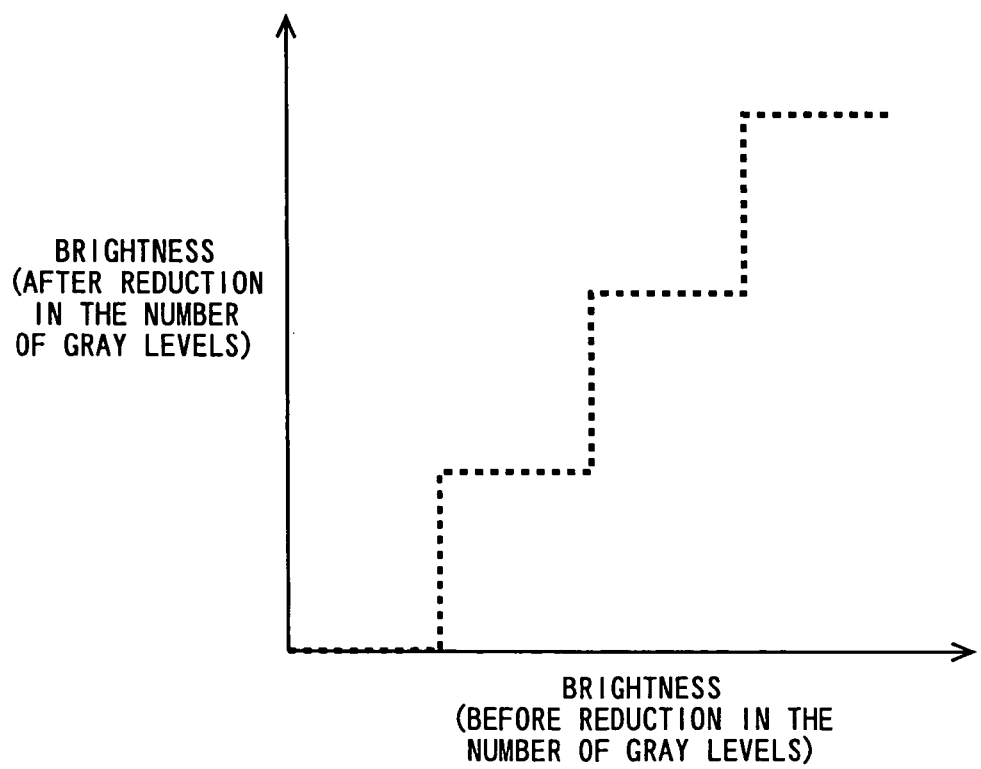

IMAGE PROCESSING PROGRAM AND IMAGE PROCESSING APPARATUS

FIELD OF THE INVENTION

The exemplary illustrative embodiments relate to an image processing program and an image processing apparatus, and more particularly to a program and an apparatus for displaying a 3D model in an animated format.

BACKGROUND AND SUMMARY OF THE INVENTION

Conventionally, there exists an image processing method called toon shading. Toon shading is a method of rendering 3D graphics such that a 3D model composed of a plurality of polygons is shaded so as to obtain a well-defined transition between light and dark, similar to an animation cel (see, for example, Japanese Laid-Open Patent Publication No. 2001-84405).

General toon shading will be described below.

In the step of shading a polygon, first, the brightness of the polygon is determined by lighting. In general shading, by multiplying the brightness by predetermined colors of the polygon and texture, light and dark tones are produced on these colors. In toon shading, on the other hand, after determining the brightness of a polygon, an extra step of calculation is performed.

Specifically, in toon shading, the process of processing brightness is performed such that the brightness is the same in a brightness range from a certain brightness to a certain brightness. After processing a gradual brightness change into a brightness change with some levels (e.g., three levels), light and dark are produced on the colors of the polygon and texture by using the brightness with some levels. In this manner, an image having a well-defined transition between light and dark, which is characteristic of an animation cel, is obtained.

The above-described conventional toon shading, however, requires special settings to render individual 3D models, whereby the amount of data is increased or the image processing program becomes complex, causing an increase in processing time.

Moreover, in the conventional toon shading, a process is performed on a polygon-by-polygon basis. Therefore, with an increase in the number of polygons to be rendered, an increase in processing load is caused.

Certain exemplary illustrative embodiments have the following features. It is to be understood that reference numerals, etc., in parentheses are provided, for the purpose of assisting in the understanding of the exemplary illustrative embodiments, as will be described later, and thus are not intended to limit the scope of the present invention.

A first aspect of certain exemplary embodiments is directed to an image processing program for causing a computer to generate an image to be viewed from a virtual camera in a 3D virtual space by rendering in a rendering region (210) a 3D model arranged in the 3D virtual space. The image processing program allows the computer to function as rendering means (S11 to S14), brightness derivation means (S22), gray level number reduction means (S23, S24), and color value changing means (S25). Specifically, in the image processing program of certain exemplary illustrative embodiments, the computer acts as the rendering means to render the 3D model in the rendering region to generate an image to be viewed from the virtual camera, acts as the brightness derivation means to derive a brightness value from color values of each pixel of the image which has been rendered in the rendering region, acts as the gray level number reduction means to reduce the number of gray levels of the brightness values derived by the brightness derivation means to convert the brightness values into brightness values for toon processing, and acts as the color value changing means to change all the color values of each pixel of the image in the rendering region based on the brightness value for toon processing.

The color values may be RGB values defined by three primary colors of light, a red value (R), a green value (G), and a blue value (B); as the brightness derivation means, the computer may convert the RGB values of each pixel in the rendering region into YUV values defined by a brightness value (Y), a bluish value (U), and a reddish value (V), thereby deriving a brightness value for each pixel; and as the color value changing means, the computer may multiply all the RGB values of each pixel in the rendering region by the brightness value for toon processing on a pixel-by-pixel basis.

As the gray level number reduction means, the computer may perform a scale-down step (S23) of scaling down the brightness values derived by the brightness derivation means and a scale-up step (S24) of scaling up the scaled-down values.

In the case where a plurality of 3D models are arranged in the virtual space, as the rendering means, the computer may render only a specific 3D model to generate unprocessed image data (S141) and then render, after the specific 3D model has been processed by the color value changing means, the rest of the 3D models (S142).

In the case where a plurality of 3D models are arranged in the virtual space, when the computer acts as the rendering means to render the 3D models to generate unprocessed image data, the computer may store flags of pixels corresponding to a specific 3D model (S143); and the computer may perform processes of the brightness derivation means, the gray level number reduction means, and the color value changing means only on the pixels corresponding to the specific 3D model by referring to the flags.

A second aspect of certain exemplary illustrative embodiments is directed to an image processing apparatus comprising a computer which has the above-described image processing program stored therein and functions by using the program.

According to certain exemplary illustrative embodiments, toon processing is performed on image data which is obtained by rendering a 3D model. Therefore, no special settings are required to render individual 3D models, and in addition, an increase in processing time due to an increase in the amount of data or a complex image processing program is not caused. Further, an infinite increase in processing load for toon processing along with an increase in the number of polygons to be rendered is not caused.

In particular, in the case where the RGB values of unprocessed image data are converted based on a brightness for toon processing by multiplying the RGB values of the unprocessed image data by the brightness for toon processing on a pixel-by-pixel basis, the image data can be converted in an animated form at without losing the gray levels of the image before being processed. Accordingly, an additional effect of being able to obtain an image which is in an animated format but maintains a somewhat realistic tone, can be obtained.

By producing brightness for toon processing by first scaling down brightness values derived by the brightness derivation means and then scaling up the scaled-down brightness values, an additional effect of being able to simplify the process of reducing the number of gray levels of the brightness can be obtained.

By performing toon processing on image data generated by rendering a specific 3D model and then rendering the rest of the 3D models, an additional effect of being able to perform toon processing only on the specific 3D model can be obtained. In addition, the same effect can be obtained by storing flags of pixels corresponding to a specific 3D model upon rendering 3D models, and performing a brightness derivation process and an image data conversion process only on the pixels corresponding to the specific 3D model based on the flags.

BRIEF DESCRIPTION OF THE DRAWINGS

These and other features and advantages will be better and more completely understood by reference to the following detailed description of exemplary illustrative embodiments in conjunction with the drawings of which:

FIG. 5 is a diagram showing brightness derived from the RGB values;

FIG. 6 is a diagram showing the relationship of brightness before and after performing a process of reducing the number of gray levels;

DETAILED DESCRIPTION

An exemplary illustrative embodiment will be described below with reference to the drawings. Note that although the exemplary illustrative embodiment describes the case of applying the exemplary illustrative embodiment to a game system, the scope of the applicability of the present invention is not limited thereto.

Figure 1:
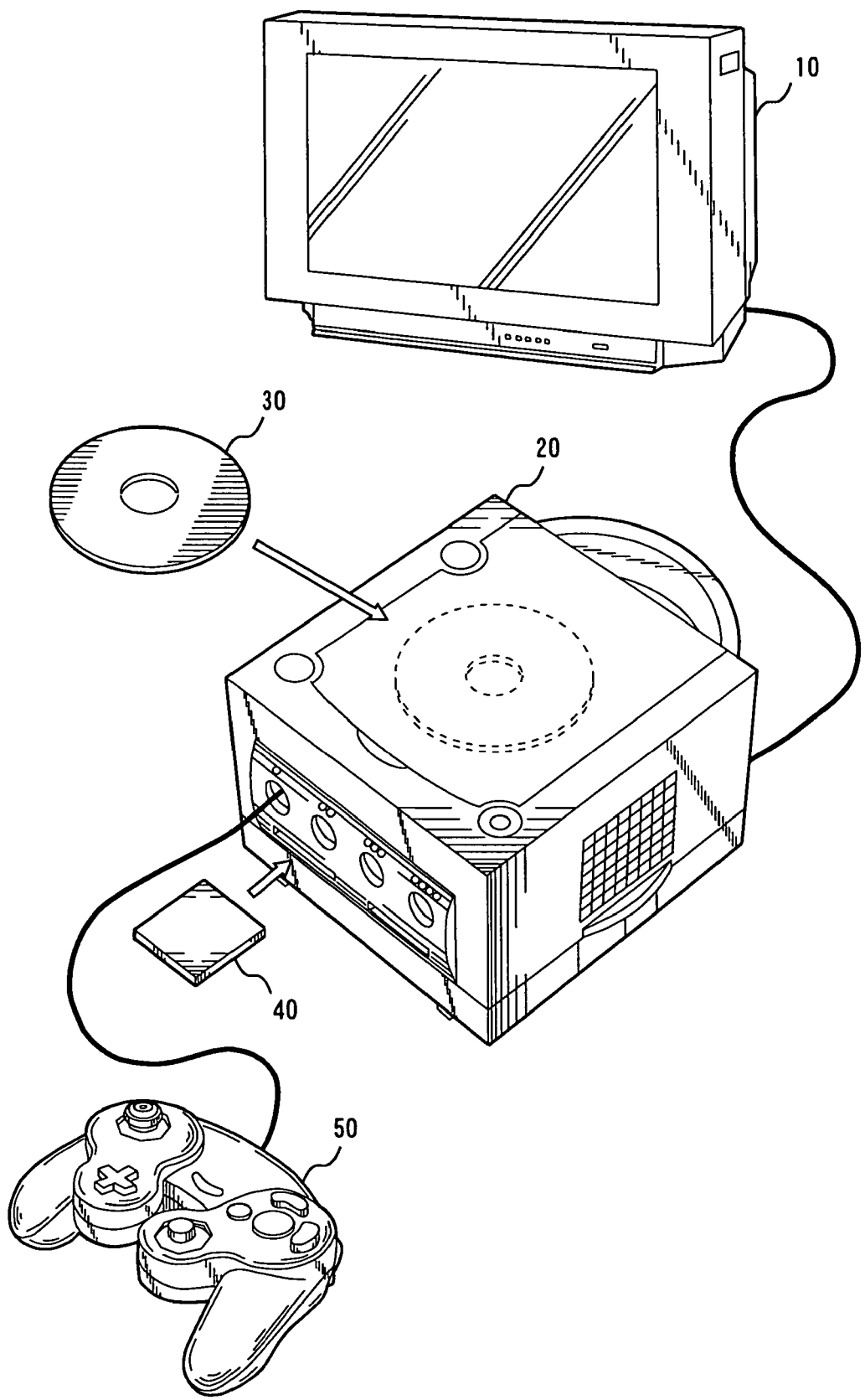
FIG. 1 is a diagram illustrating the entire configuration of a game system according to an exemplary illustrative embodiment.
Figure 2:
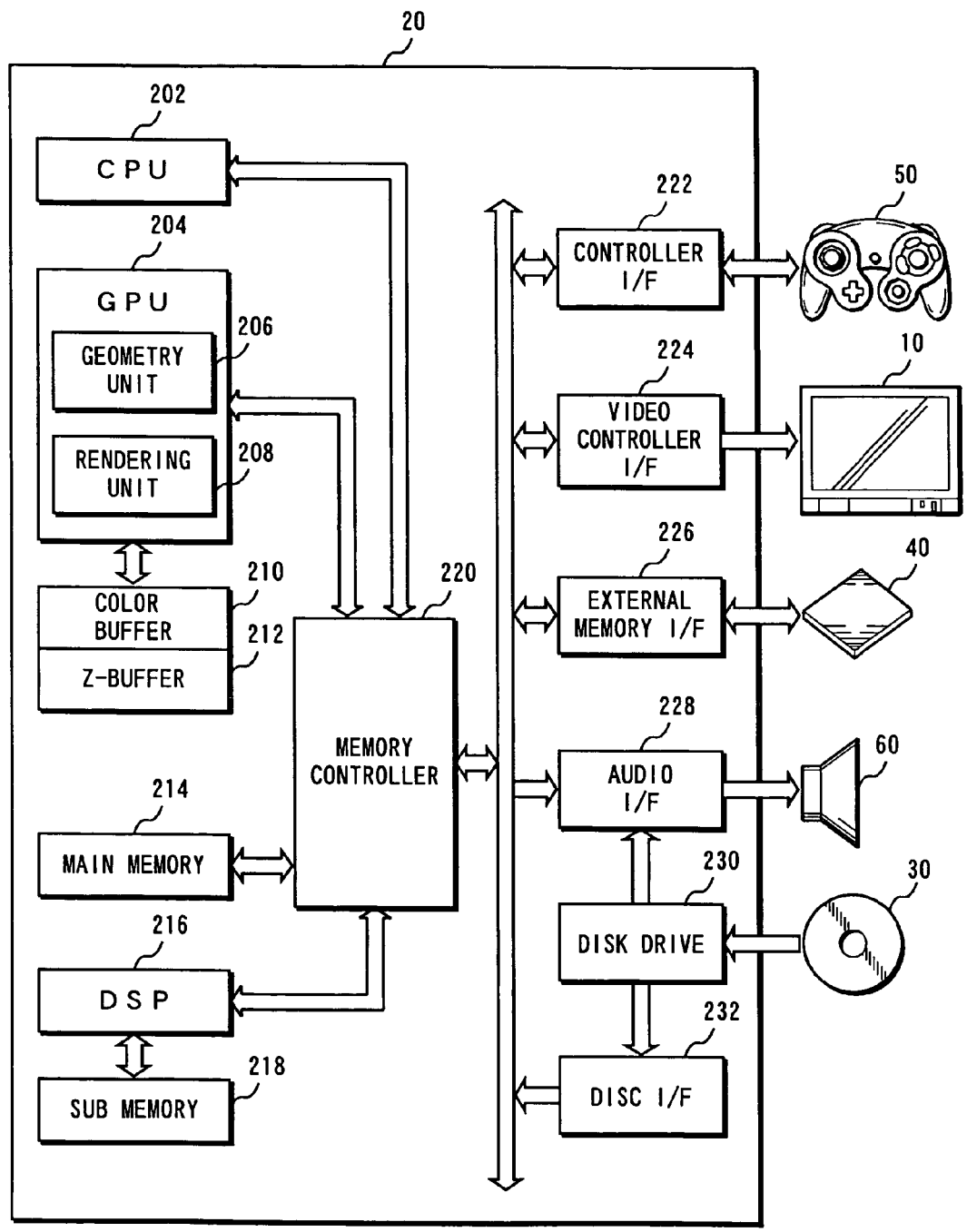
FIG. 2 is a block diagram showing a configuration of a game machine main unit 20.

FIG. 1 is an external view illustrating a configuration of a game system, and FIG. 2 is a block diagram of the game system. As shown in FIGS. 1 and 2, the game system includes a TV monitor 10, a game machine main unit 20, a DVD-ROM 30, an external memory card 40, a controller 50, and a speaker 60. The DVD-ROM 30 and the external memory card 40 can be loaded into and unloaded from the game machine main unit 20 at will. The controller 50 is connected through a communication cable to any one of a plurality of controller port connectors (four connectors in FIG. 1) of the game machine main unit 20. The TV monitor 10 and the speaker 60 are connected to the game machine main unit 20 through AV cables, or the like. Note that the game machine main unit 20 and the controller 50 may communicate by radio communication. Each component of the game system will be described in more detail below with reference to FIG. 2.

The DVD-ROM 30 has a game program, game data, and the like stored thereon permanently. When the player plays a game, the DVD-ROM 30 is loaded into the game machine main unit 20. As a means of storing a game program and the like, an external storage medium such as a CD-ROM, an MO, a memory card, or a ROM cartridge, for example, may also be used instead of the DVD-ROM 30.

The external memory card 40 is comprised of a rewritable storage medium such as a flash memory, for example, and stores data such as save data of a game, for example.

The game machine main unit 20 reads a program stored on the DVD-ROM 30 and performs a process in accordance with the read program.

The controller 50 is an input apparatus used by the player to make a game control input, and has a plurality of control switches. The controller 50 outputs control data to the game machine main unit 20 based on the player's operation (e.g., a pressing operation) performed on the control switches.

The TV monitor 10 displays image data outputted from the game machine main unit 20 on a screen. The speaker 60 is typically built in the TV monitor 10 and outputs the sound of the game outputted from the game machine main unit 20.

Next, the configuration of the game machine main unit 20 will be described. In FIG. 2, in the game machine main unit 20 there are provided a CPU 202 and a memory controller 220 connected to the CPU 202. Further, in the game machine main unit 20, the memory controller 220 is connected to a GPU (Graphics Processing Unit) 204, a main memory 214, a DSP 216, and various interfaces (I/F) 222, 224, 226, 228, and 232. The memory controller 220 controls data transfer between these components.

Upon the start of the game, first, a disk drive 230 drives the DVD-ROM 30 loaded into the game machine main unit 20. The game program stored on the DVD-ROM 30 is read into the main memory 214 through the disk I/F 232 and the memory controller 220. The program in the main memory 214 is executed by the CPU 202, thereby starting the game. After the game has started, the player makes a game control input, etc., to the controller 50 using the control switches. In response to the input from the player, the controller 50 outputs control data to the game machine main unit 20. The control data outputted from the controller 50 is supplied to the CPU 202 through the controller I/F 222 and the memory controller 220. The CPU 202 performs game processing in accordance with the inputted control data. When producing image data, etc., during the game processing, the GPU 204 and the DSP 216 are used. In addition, a sub memory 218 is used when the DSP 216 performs a process.

The GPU 204 has a geometry unit 206 and a rendering unit 208, and is connected to a memory dedicated to image processing. The image-processing dedicated memory is used as a color buffer 210 and/or a Z buffer 212, for example. The geometry unit 206 performs computations regarding the coordinates of a 3D model (e.g., an object comprised of polygons) such as an object or graphics placed in a game space which is a virtual 3D space. For example, the geometry unit 206 performs rotation, scaling, and deformation on the 3D model or performs transformation from world to view coordinates or from world to screen coordinates. The rendering unit 208 produces a game image by writing to the color buffer 210 color data (RGB data) of each pixel of a 3D model projected to screen coordinates, based on a predetermined texture. The color buffer 210 is a memory region allocated to hold the game image data (RGB data) produced by the rendering unit 208. The Z buffer 212 is a memory region allocated to hold information about the depth from the viewpoint which will be lost when transforming from 3D view coordinates to 2D screen coordinates. The GPU 204 produces image data to be displayed on the TV monitor 10 using these buffers and appropriately outputs the image data to the TV monitor 10 through the memory controller 220 and the video I/F 224. The audio data to be generated in the CPU 202 during execution of the game program is outputted to the speaker 60 from the memory controller 220 through the audio I/F 228. Note that certain example embodiments employ a hardware configuration in which the image-processing dedicated memory is additionally provided, however, the hardware configuration is not limited thereto; for example, it is also possible to employ a technique (e.g., UMA: Unified Memory Architecture) where a part of the main memory 214 is used as a memory for image processing.

Figure 3:
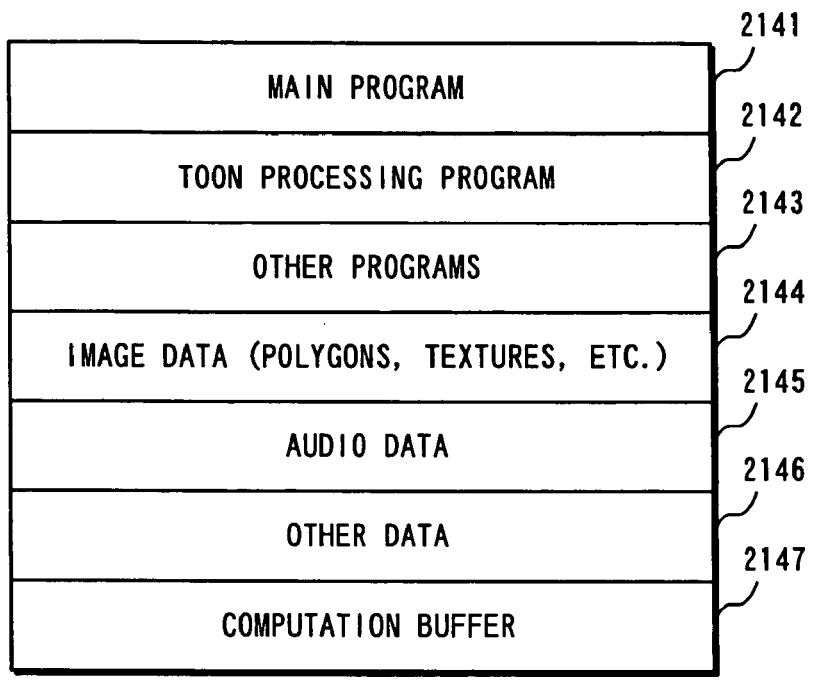
FIG. 3 is a diagram showing a memory map of a main memory 214.

With reference to FIG. 3, the memory map of the main memory 214 will be described. In the main memory 214 there are stored various programs (a main program 2141, a toon processing program 2142, and other programs 2143) which are read from the DVD-ROM 30. The main program 2141 is used to execute game processing. The toon processing program 2142 is an image processing program which is a part of certain exemplary illustrative embodiments and used to convert image data in an animated format.

In addition, in the main memory 214 there are stored various data (image data 2144, audio data 2145, and other data 2146) which is used by the above-described programs. The image data 2144 includes, for example, data about polygons comprising a 3D model which is arranged in the virtual game space, textures used to assign colors to the polygons, and the like.

In addition, in the main memory 214 there is prepared a computation buffer 2147 for temporarily storing the results of computations performed by the CPU 202.

Now, the operation of a game system of certain exemplary illustrative embodiments will be described.

Before providing a detailed description, first, the principles of image processing of certain exemplary illustrative embodiments will be briefly described. In certain exemplary illustrative embodiments, a 3D model (object) arranged in the 3D virtual game space is rendered with normal shading (light shading), and then toon processing (image processing for converting in an animated format) is performed on the image data generated by the rendering.

Figure 4:
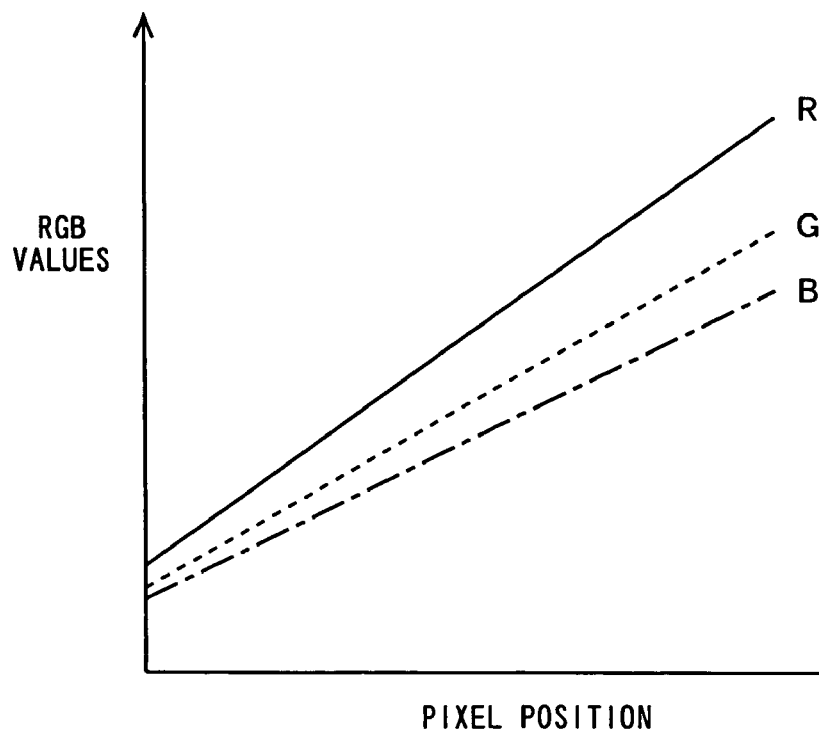
FIG. 4 is a diagram showing exemplary RGB values of image data before toon processing.

Here, an example case is described where the image data generated by the rendering has a pink gradation portion. In this case, it is assumed that the RGB values of each pixel of the gradation portion take values as shown in FIG. 4. That is, the color gradually changes from dark pink to light pink.

In certain exemplary illustrative embodiments, first, brightness information is derived from these RGB values. Generally, brightness can be derived by taking a weighted average of RGB values. The brightness derived from the RGB values shown in FIG. 4 is shown in FIG. 5.

Subsequently, by reducing the number of gray levels, the derived brightness is converted into brightness for toon processing. The relationship of brightness before and after performing the conversion process is shown in FIG. 6. In the example of FIG. 6, the number of gray levels of the brightness is reduced to four. As a result of performing the gray-level reduction process shown in FIG. 6 on the brightness of all pixels shown in FIG. 5, the brightness for toon processing of each pixel is obtained such as that shown in FIG. 7.

Figure 7:
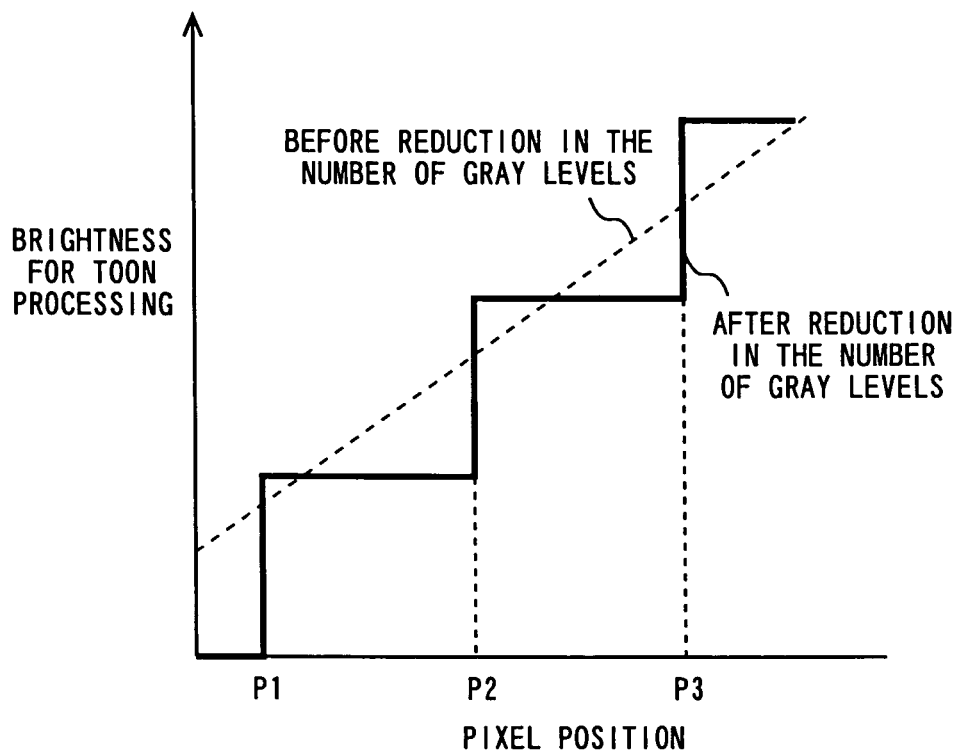
FIG. 7 is a diagram showing brightness for toon processing which is obtained by reducing the number of gray levels of brightness.
Figure 8:
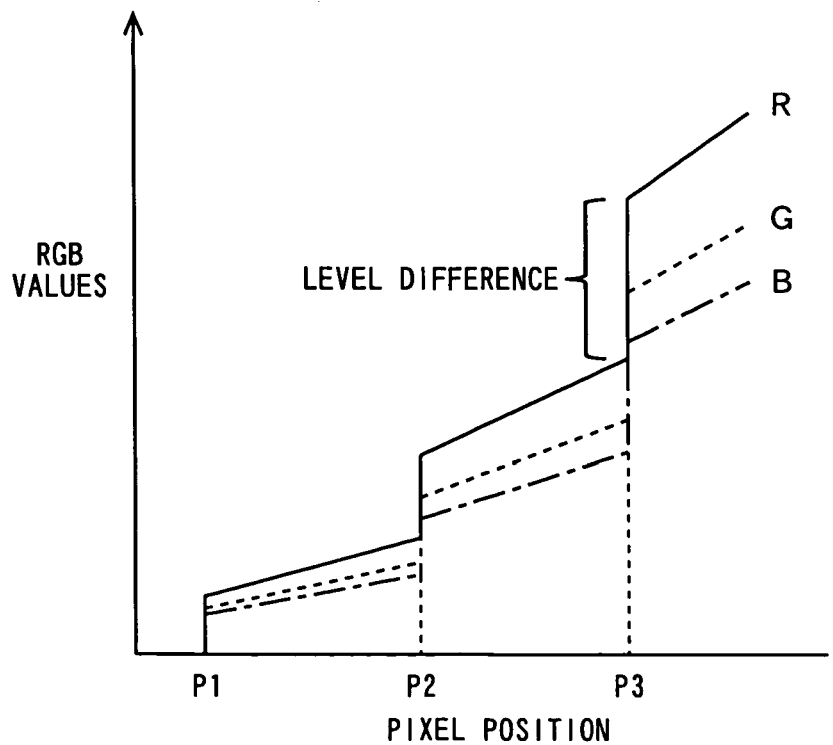
FIG. 8 is a diagram showing results obtained by converting RGB values based on brightness for toon processing.

Finally, the RGB values shown in FIG. 4 are converted based on the brightness for toon processing shown in FIG. 7, whereby image data in an animated format is obtained. This conversion method is variable. For example, brightness for toon processing and RGB values may be multiplied on a pixel-by-pixel basis, or RGB values may be converted such that the brightness of the RGB values corresponds to brightness for toon processing while keeping the ratio of the RGB values. In the former case, image data shown in FIG. 8 is obtained. In the latter case, image data shown in FIG. 9 is obtained.

Figure 9:
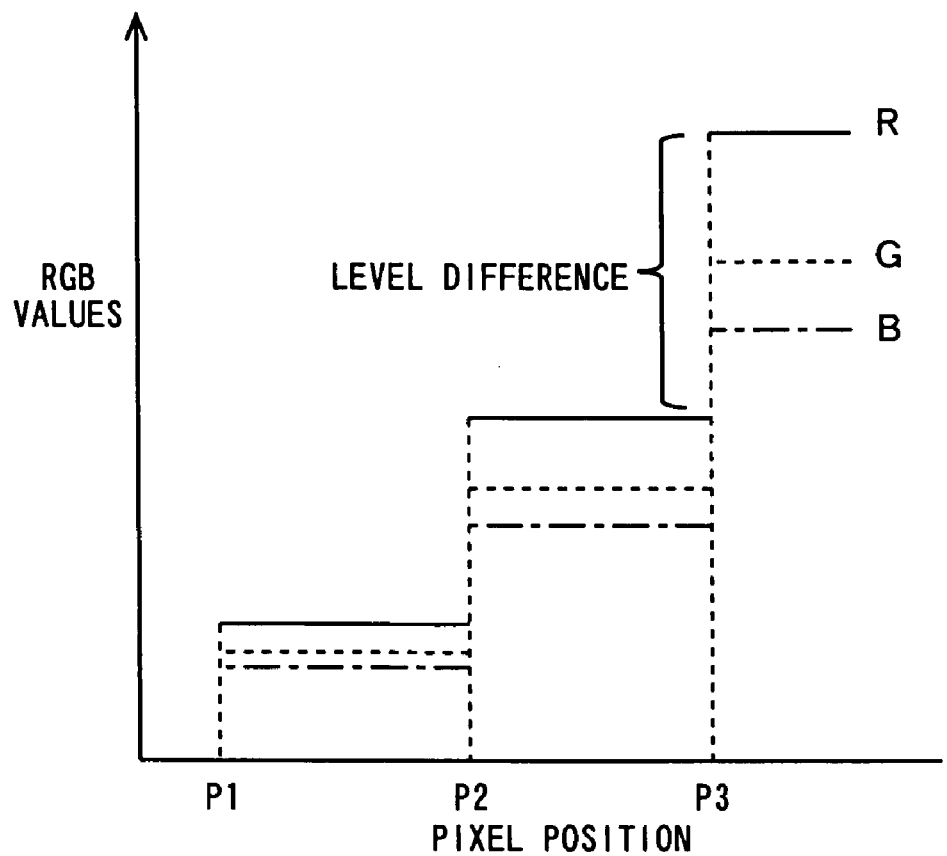
FIG. 9 is a diagram showing results obtained by converting RGB values based on brightness for toon processing.

In FIGS. 8 and 9, there is a large level difference between positions P1, P2, and P3, thereby making processed image data in an animated format. Here, since the ratio of the RGB values for each pixel is kept the same as that shown in FIG. 4 (note, however, that strictly speaking, the ratio may slightly change due to the characteristics of digital data), in either of the above cases the "color tone" of the image does not change before and after performing toon processing.

Figure 10:
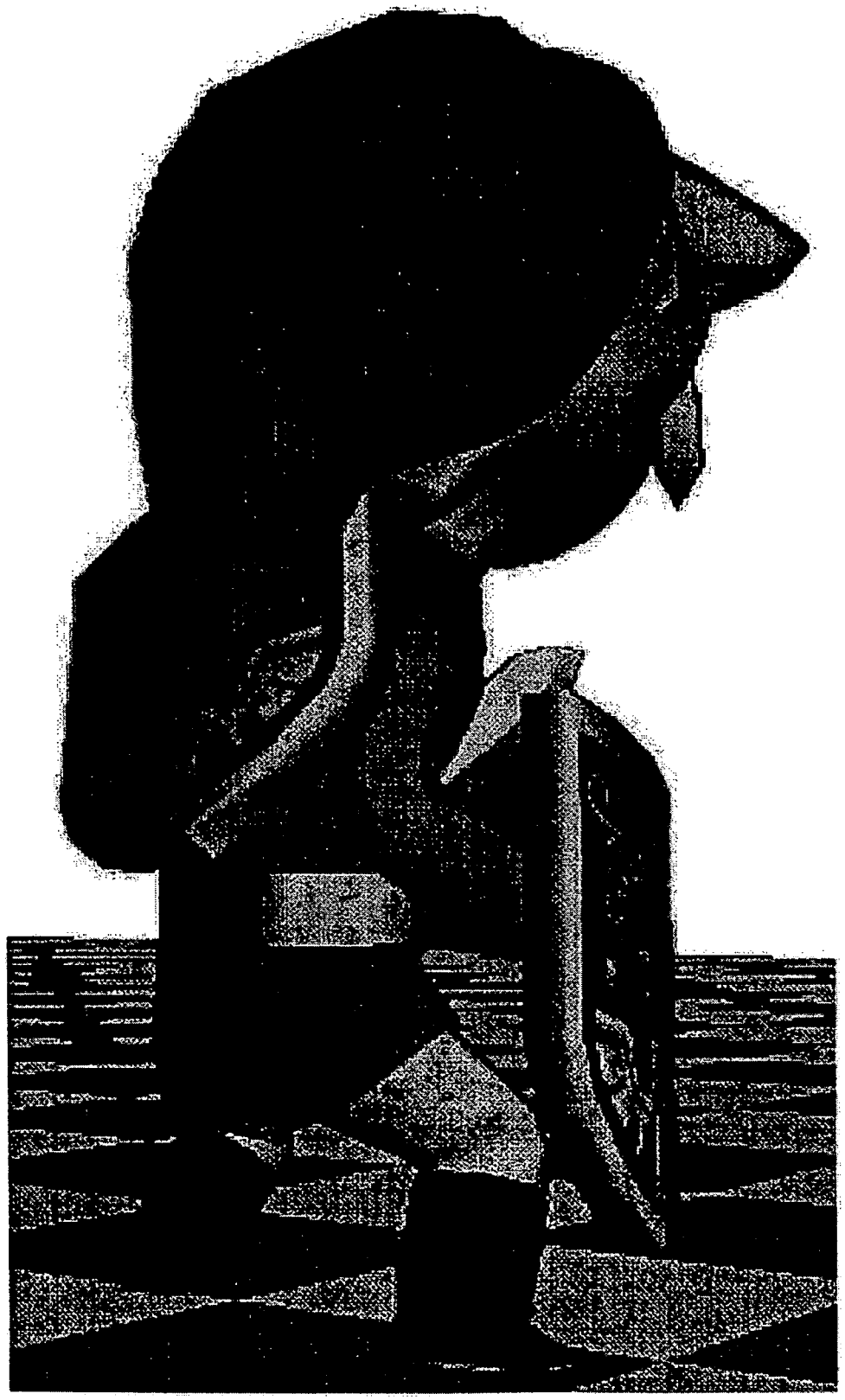
FIG. 10 is a diagram illustrating an exemplary image before performing toon processing.
Figure 11:
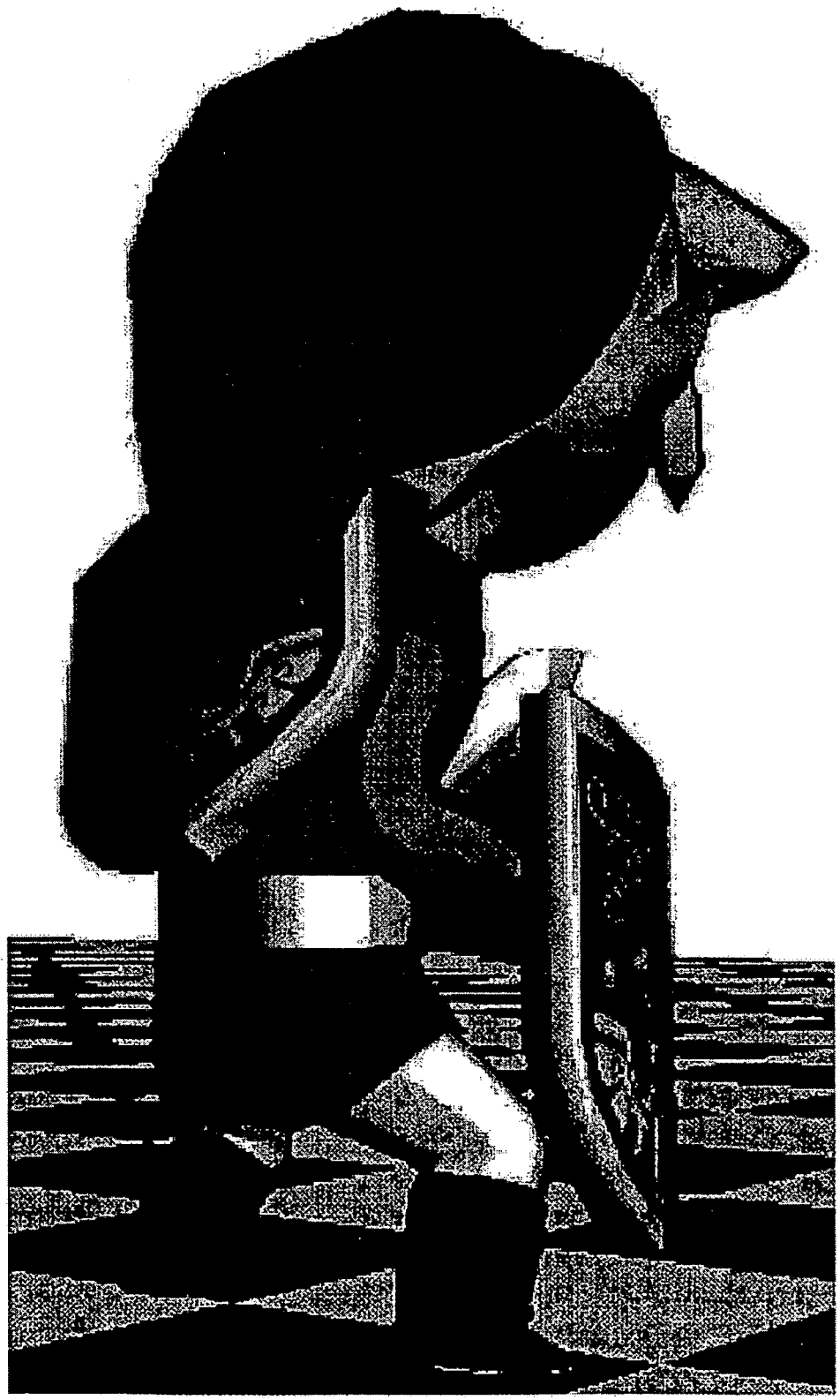
FIG. 11 is a diagram illustrating an exemplary image after performing toon processing.

In particular, in the example case of FIG. 8, since the change in gray level of the image obtained before processing is maintained after processing (for example, the RGB values change gradually between P1 and P2 in FIG. 8; however, the degree of change after processing is less than that obtained before processing), an image which is in an animated format but maintains a certain degree of realism can be obtained. For example, in the case where such toon processing is performed on an image shown in FIG. 10, an image shown in FIG. 11 is obtained.

With reference to flowcharts shown in FIGS. 12 and 13, the operation of the game system of certain exemplary illustrative embodiments will be described.

Figure 12:
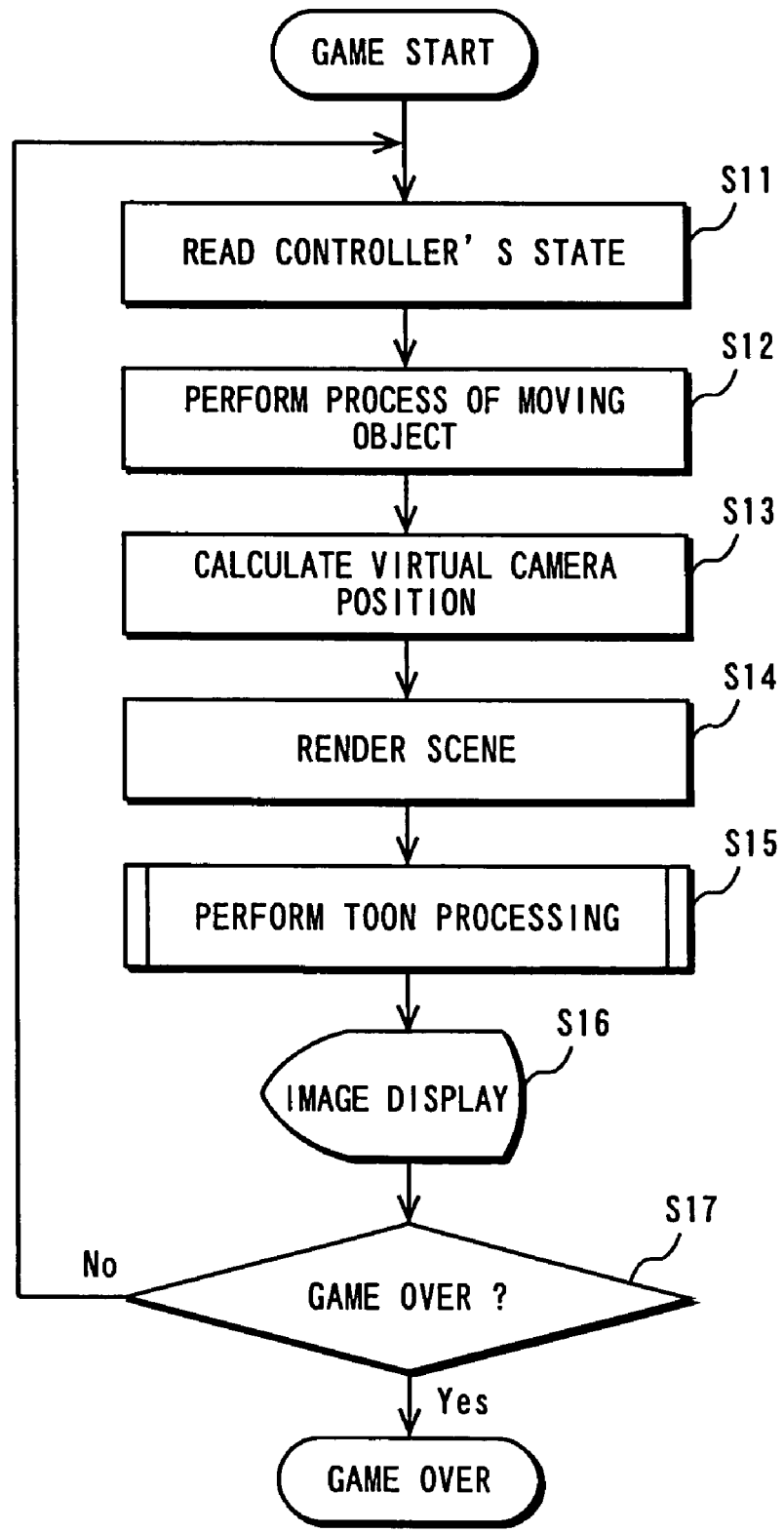
FIG. 12 is a flowchart showing the operation of the game system.

In FIG. 12, upon the start of the game, first, the CPU 202 reads data indicating the state of the controller 50, e.g., data indicating which button is being pressed (this data is transmitted to the game machine main unit 20 from the controller 50 and saved in the main memory 214 of the game machine main unit 20) (S11). Subsequently, an object in the virtual game space is allowed to move in accordance with the controller's state which is read at step S11 (S12). Then, the position of a virtual camera in the virtual game space is calculated (S13) and a scene is rendered based on the virtual camera (S14). Image data resulting from the rendering is stored in the color buffer 210.

At step S15, the CPU 202 performs toon processing in accordance with the toon processing program 2142. To on processing will be described in detail later. As a result of toon processing, image data in an animated format is stored in the color buffer 210. At step S16, an image is displayed on the TV monitor 10 based on the image data in an animated format. Then, the CPU 202 determines whether the game is over (S17). If the game is still in progress, processing returns to step S11.

Figure 13:
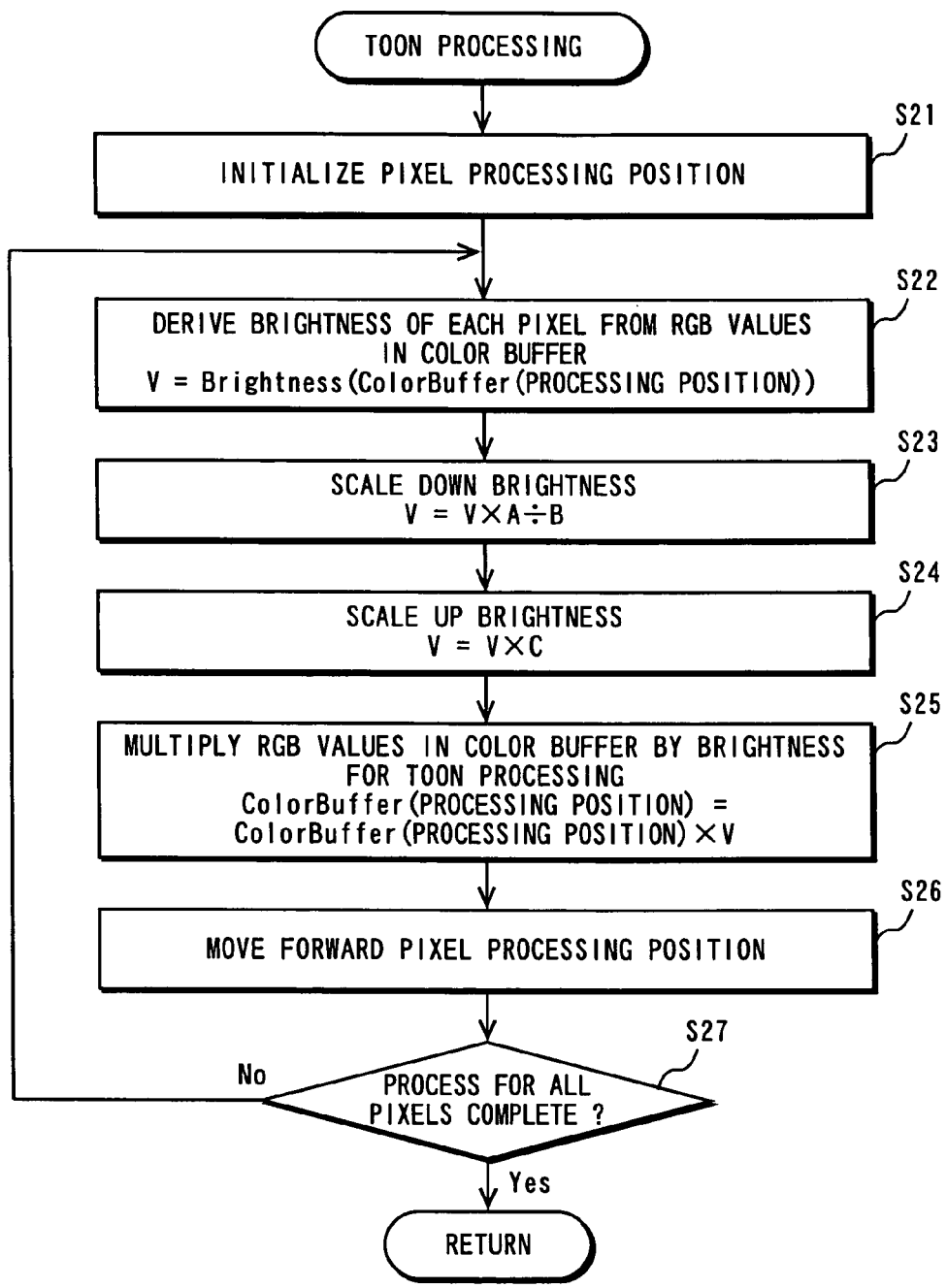
FIG. 13 is a flowchart showing the flow of toon processing shown in FIG. 12.

With reference to FIG. 13, toon processing of step S15 will be described in detail. When toon processing is started, the CPU 202 first initializes the processing position which indicates a pixel to be processed in the color buffer 210 (S21). Then, toon processing is sequentially performed on a pixel-by-pixel basis while shifting a pixel to be processed.

The CPU 202 first derives the brightness of a pixel at the current processing position based on the color values (which correspond to the RGB values in FIG. 4) of the current processing position in the color buffer 210 (S22). The brightness derivation can be achieved by the function of the GPU, e.g., by hardware; for example, since it the color buffer 210 may save the color values in the form of RGB values, the RGB values are converted into YUV values and a brightness value (Y) is derived from the YUV values. Though the conversion of RGB values to YUV values is known, one example for conversion is provided below:

$$Y=0.2989 \times R+0.5866 \times G+0.1145 \times B;$$

$$U=-0.1684 \times R-0.3311 \times G+0.4997 \times B;\text{ and}$$

$$V=0.4998 \times R-0.4187 \times G-0.0813 \times B.$$

This brightness corresponds to that shown in FIG. 5.

Subsequently, by reducing the number of gray levels of this brightness, the brightness is converted into brightness for toon processing. The conversion process can be performed in various ways. For example, the brightness may be converted using functions which indicate inputs and outputs, such as those shown in FIG. 6. In the flowchart shown in FIG. 13, as a variation of the conversion process, a process is employed where the brightness is first scaled down (S23) and then scaled up (S24). In other words, the number of gray levels is reduced by rounding each brightness to a nearest value among predetermined interval values. The principles of this process will be described below with reference to FIGS. 14A to 14C.

Figure 14A:
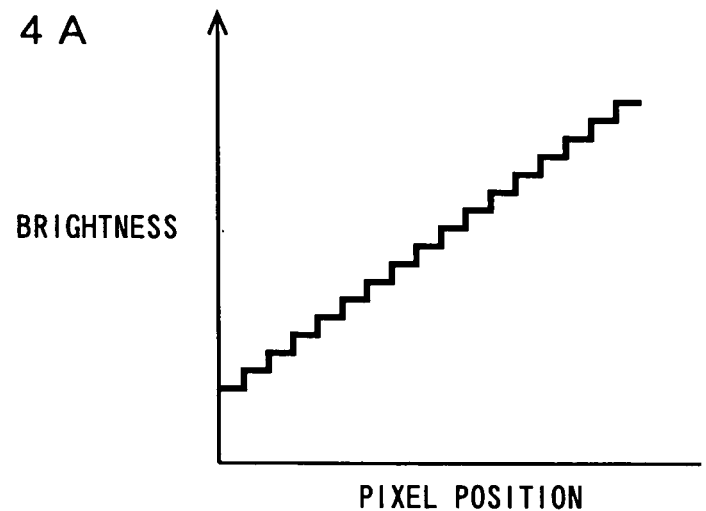
FIGS. 14A to 14C are diagrams showing an exemplary method of converting brightness derived from RGB values into brightness for toon processing.
Figure 14B:
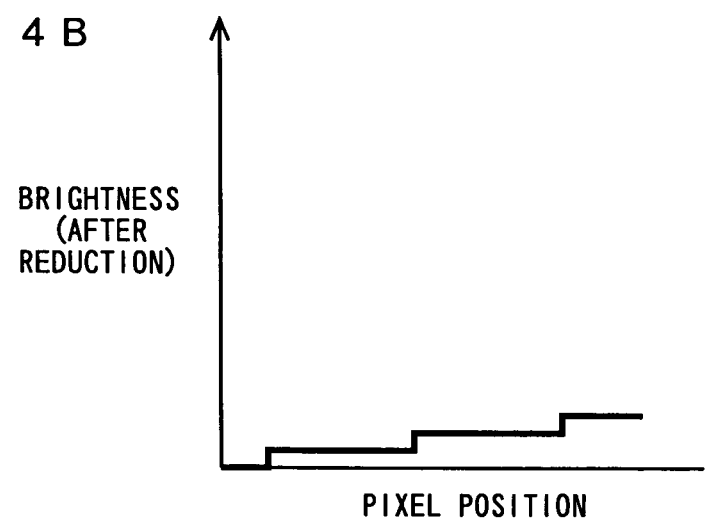
Figure 14C:
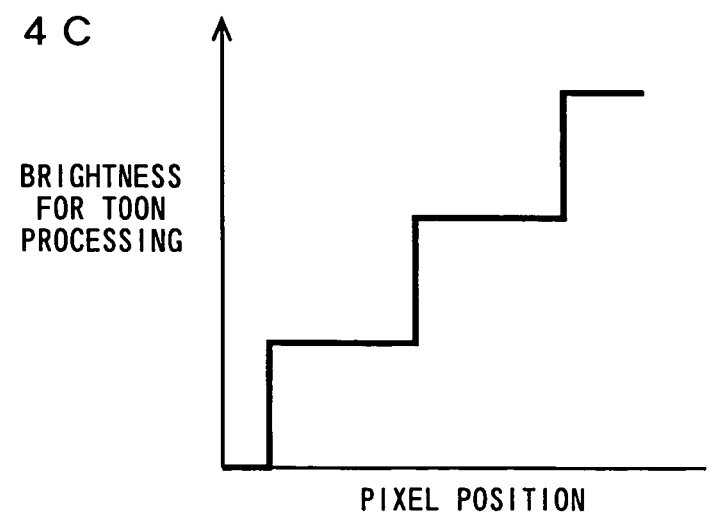

Since brightness is represented by digital data, in practice, brightness may take discrete values (e.g., 256 gray levels) such as those shown in FIG. 14A. At step S23 in FIG. 13, the brightness is scaled down, and as a result, the brightness values turn to values shown in FIG. 14B and the number of gray levels is reduced to as low as four. Thereafter, at step S24 in FIG. 13, the brightness whose number of gray levels has been reduced is greatly scaled up, and as a result, the brightness values turn to values shown in FIG. 14C. The values shown in FIG. 14C are used as brightness for toon processing. As is described, by utilizing the characteristics of digital data, the number of gray levels of brightness can be reduced with a simpler process.

Note that by increasing the degree of scale-down at step S23, the number of gray levels is further reduced, whereby a more highly animated image can be obtained. On the contrary, the smaller the degree of scale-down, the more realistic an image can be obtained. That is, by adjusting "A+B" shown in FIG. 13, the degree of animation of the final image can be adjusted. Of course, it is possible to allow the user to freely make this adjustment.

Since the RGB values of the image before processing is ultimately multiplied by brightness for toon processing, the scale of the brightness for toon processing exerts a great influence on the brightness of the final image. Therefore, the greater the degree of scale-up at step S24, the more the resulting image becomes lighter. On the contrary, the smaller the degree of scale-up, the more the resulting image becomes darker. That is, by adjusting "C" shown in FIG. 13, the overall brightness of the final image can be adjusted. Of course, it is possible to allow the user to freely make this adjustment.

At step S25, the CPU 202 multiplies each RGB value of the current processing position in the color buffer 210 by the brightness for toon processing obtained in the manner described above. Then, the RGB values in the color buffer 210 are overwritten with the values resulting from the multiplication.

Subsequently, the CPU 202 moves forward the processing position of a pixel in the color buffer 210 (S26), and then determines whether the process for all pixels in the color buffer 210 has been completed (S27). If it has, the CPU 202 finishes toon processing, and processing proceeds to step S16 shown in FIG. 12. If there is any unprocessed pixel, processing returns to step S22.

As a result of the above-described processes, a 3D model is displayed in an animated format on the TV monitor 10.

There may be a case for performing toon processing only on a specific object among objects (3D models) in a virtual game space. In this case, with conventional toon shading, it is easy to perform toon processing only on a specific object; however, in the case of certain exemplary illustrative embodiments, toon processing is performed on image data which has been obtained by rendering a 3D model, and thus a special technique is required to perform toon processing only on a specific object. Two methods of performing toon processing on a specific object will be described below.

Figure 15:
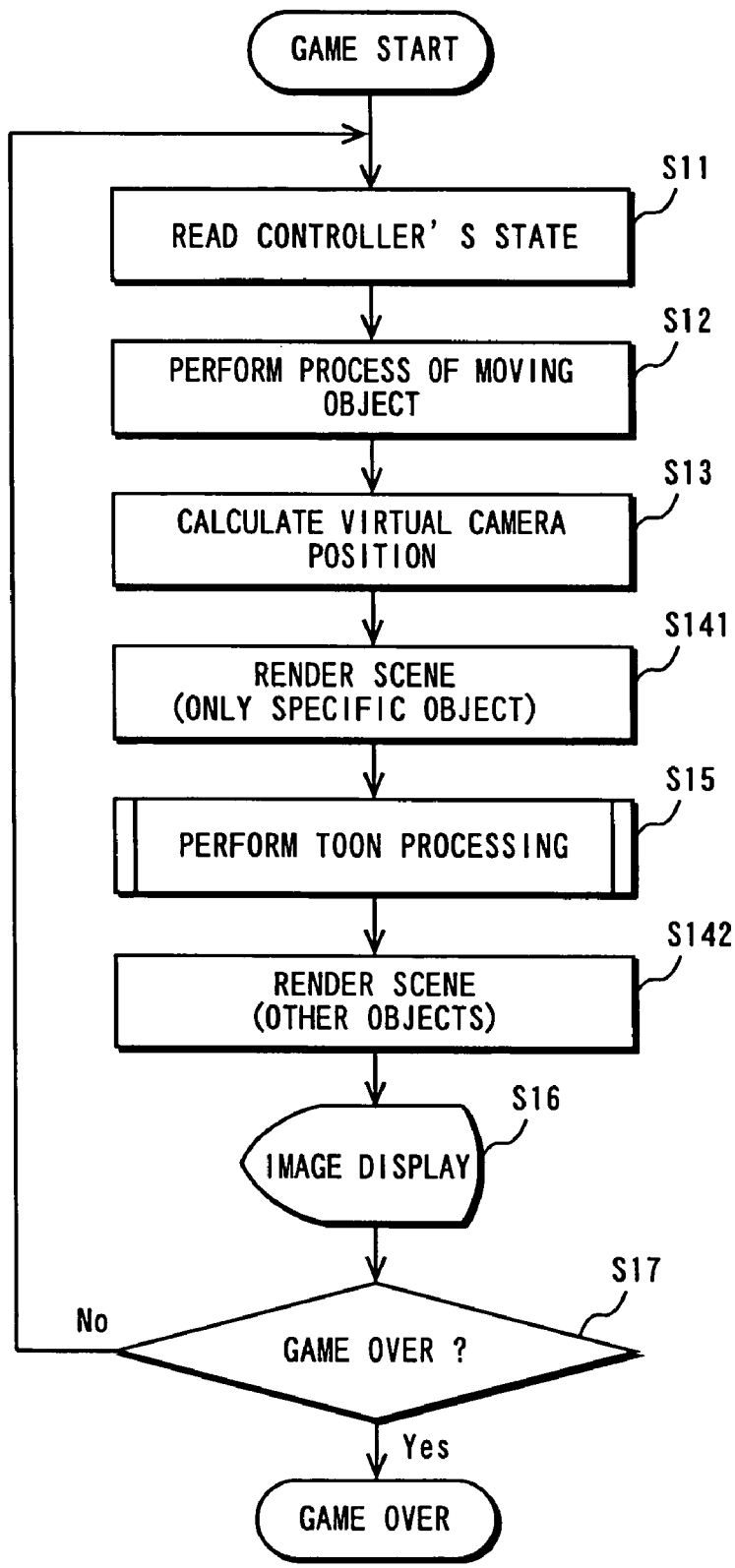
FIG. 15 is a flowchart showing the operation of the game system in the case where toon processing is performed only on a particular object.

The first method is as follows. As shown in FIG. 15, when rendering a scene, first, rendering is performed only on an object which requires toon processing (S141), and then toon processing is performed on image data generated at S141 (S15). Thereafter, rendering is performed on the rest of the objects (S142), thereby completing rendering of the entire scene. Note that in FIG. 15, the same processes as those of FIG. 12 are designated by the same reference numerals. In this manner, only the object having been rendered at step S141 is displayed in an animated format.

Figure 16:
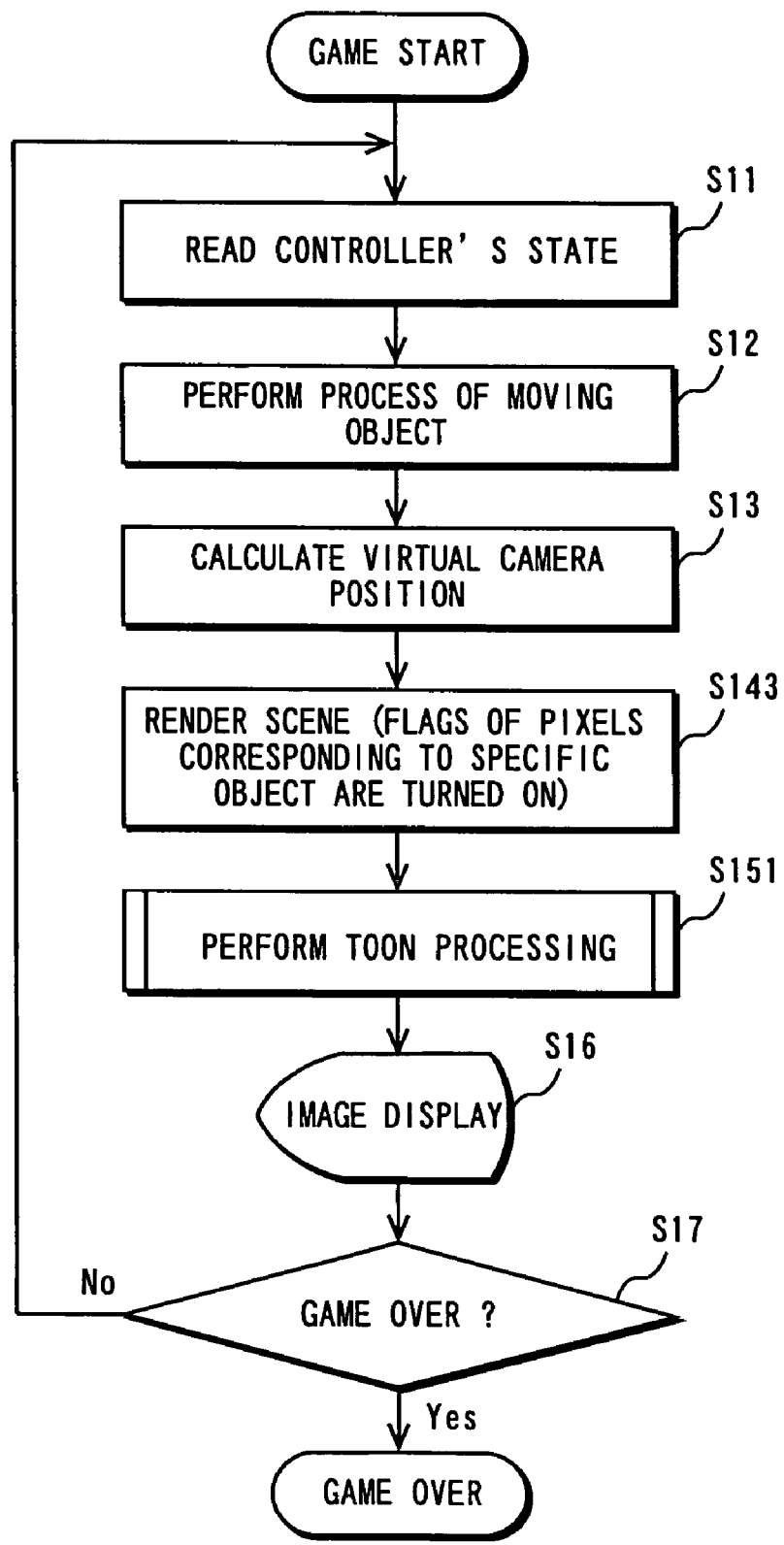
FIG. 16 is a flowchart showing the operation of the game system in the case where toon processing is performed only on a particular object.
Figure 17:
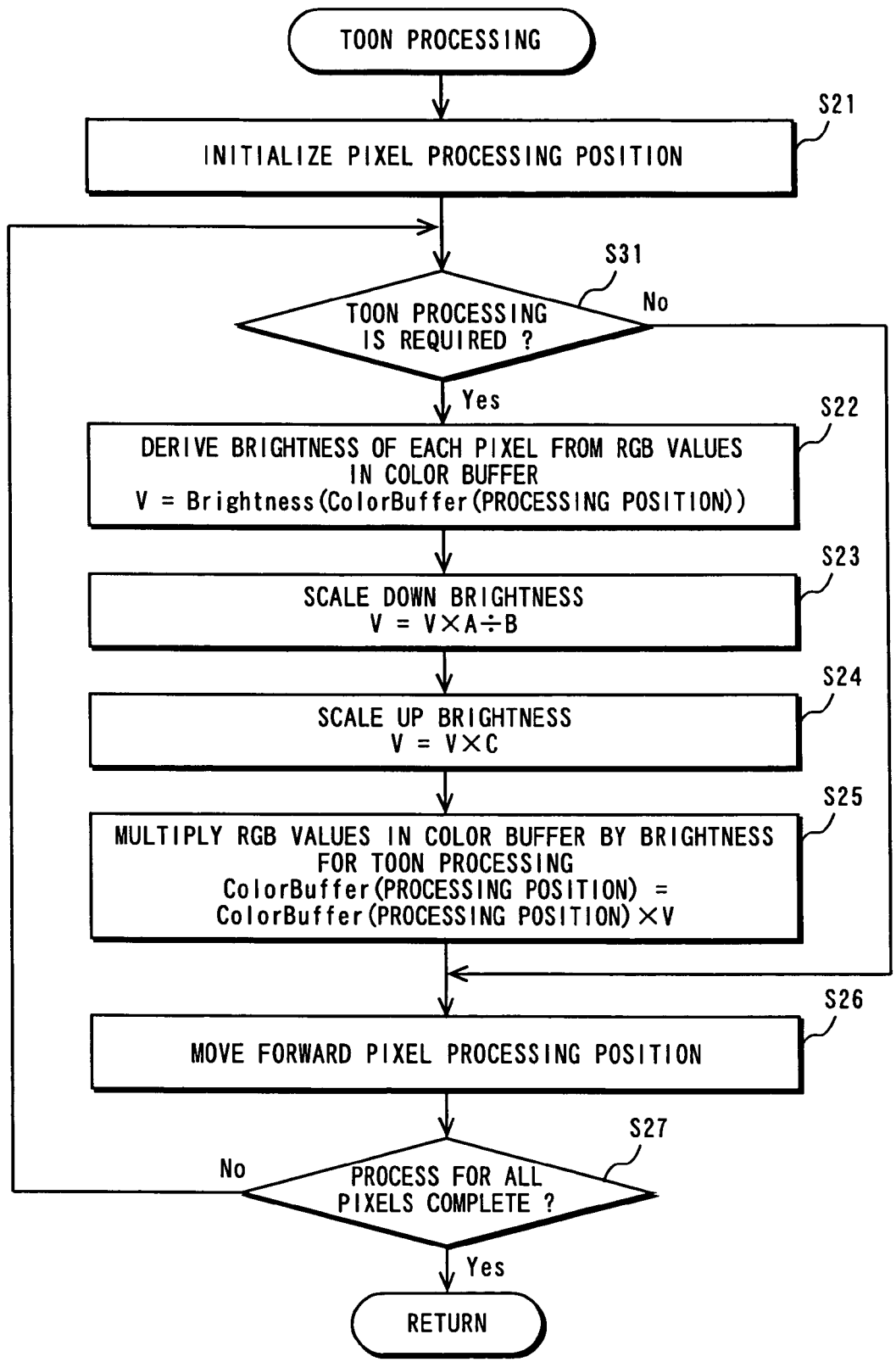
FIG. 17 is a flowchart showing the flow of the toon processing shown in FIG. 16.

The second method is as follows. Each pixel is provided with a flag indicating whether it requires toon processing. As shown in FIG. 16, when rendering a scene, the flags of pixels corresponding to an object which requires toon processing are turned on (S143). The flag is referred to in the following manner. An alpha buffer (not shown) is allocated in the storage region together with the color buffer. Upon rendering, at the same time as color writing, an alpha value, "0" or "1", is written to the alpha buffer, and upon toon processing the value in the alpha buffer is referred to as a flag. In toon processing at step S151, as shown in FIG. 17, the CPU 202 at step S31 determines whether the pixel to be processed requires toon processing, by referring to the above-described flag. If toon processing is not required, processing proceeds to step S26 without performing the processes of steps S22 to S25. Note that in FIGS. 16 and 17, the same processes as those of FIGS. 12 and 13 are designated by the same reference numerals. In this manner, only the object corresponding to the pixels whose flags have been turned on at step S143 is displayed in an animated format.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer-readable storage medium having stored thereon an image processing program for causing a video game processing apparatus comprising a computer to generate an image to be viewed from a virtual camera in a 3D virtual space by rendering in a rendering region a 3D model arranged in the 3D virtual space, the program allowing a computer to act as:

rendering programmed logic circuitry for rendering the 3D model in the rendering region to generate an image to be viewed from the virtual camera;

brightness derivation programmed logic circuitry for deriving a brightness value from color values of each pixel of the image rendered in the rendering region;

gray level number reduction programmed logic circuitry for reducing the number of gray levels of the brightness values derived by the brightness derivation programmed logic circuitry, to convert the brightness values into brightness values for toon processing; and color value changing programmed logic circuitry for changing all the color values of each pixel of the image in the rendering region based on the brightness values for toon processing.

2. The computer-readable storage medium according to claim 1, wherein
the color values are RGB values defined by three primary colors of light, including a red value (R), a green value (G), and a blue value (B),
the brightness derivation programmed logic circuitry is configured to convert the RGB values of each pixel in the rendering region into YUV values defined by a brightness value (Y), a bluish value (U), and a reddish value (V), to derive a brightness value for each pixel; and
the color value changing programmed logic circuitry is configured to multiply all the RGB values of each pixel in the rendering region by the brightness value for toon processing on a pixel-by-pixel basis.

3. The computer-readable storage medium according to claim 1, wherein the gray level number reduction programmed logic circuitry is configured to scale down the brightness values derived by the brightness derivation programmed logic circuitry and scale up the scaled-down values.

4. The computer-readable storage medium according to claim 1, wherein
a plurality of 3D models are arranged in the virtual space, and
the rendering programmed logic circuitry is configured to render at least one 3D model of the plurality of 3D models to generate unprocessed image data and then render, after the at least one 3D model has been processed by the color value changing programmed logic circuitry, the rest of the 3D models in the plurality of 3D models.

5. The computer-readable storage medium according to claim 1, wherein
a plurality of 3D models are arranged in the virtual space,
when the rendering programmed logic circuitry renders the 3D models to generate unprocessed image data, the rendering programmed logic circuitry is configured to store flags of pixels corresponding to at least one 3D model of the plurality of 3D models; and
the brightness derivation programmed logic circuitry, the gray level number reduction programmed logic circuitry, and the color value changing programmed logic circuitry are configured to operate only on the pixels corresponding to the at least one 3D model by referring to the flags.

6. A video game apparatus comprising a computer configured to execute the image processing program stored on the computer-readable storage medium of claim 1.

7. A computer-implemented method for generating an image to be viewed from a virtual camera in a 3D virtual space by rendering in a rendering region a 3D model arranged in the 3D virtual space, the method being performed by executing, on the computer of a video game apparatus, instructions tangibly stored on a computer-readable storage medium, the method comprising:
rendering the 3D model in the rendering region to generate an image to be viewed from the virtual camera;
deriving a brightness value from color values of each pixel of the image that has been rendered in the rendering region;
reducing the number of gray levels of the derived brightness values to convert the brightness values into brightness values for toon processing; and
changing all the color values of each pixel of the image in the rendering region based on the brightness values for toon processing.

8. The method according to claim 7, wherein the color values are RGB values defined by three primary colors of light, including a red value (R), a green value (G), and a blue value (B), and further comprising:
converting the RGB values of each pixel in the rendering region into YUV values defined by a brightness value (Y), a bluish value (U), and a reddish value (V), to derive a brightness value for each pixel; and
multiplying all the RGB values of each pixel in the rendering region by the brightness value for toon processing on a pixel-by-pixel basis during the color value changing step.

9. The method according to claim 7, further comprising during the gray level number reducing step, scaling down the derived brightness values and scaling up the scaled-down values.

10. The method according to claim 7, wherein a plurality of 3D models are arranged in the virtual space, and further comprising:
rendering at least one 3D model of the plurality of 3D models to generate unprocessed image data; and
rendering, after the at least one 3D model has had its color value changed, the rest of the 3D models.

11. The method according to claim 7, wherein a plurality of 3D models are arranged in the virtual space, and further comprising:
when rendering the 3D models to generate unprocessed image data, storing flags of pixels corresponding to at least one 3D model of the plurality of 3D models; and
performing the brightness deriving, the gray level number reducing, and the color value changing only on the pixels corresponding to the at least one 3D model by referring to the flags.

* * * * *